United States Patent

Skaggs

[15] 3,647,097

[45] Mar. 7, 1972

[54] TRUCK BED

[72] Inventor: Preston H. Skaggs, P. O. Box 491, Riverton, Wyo. 82501

[22] Filed: Aug. 21, 1969

[21] Appl. No.: 851,841

[52] U.S. Cl. ..........................................214/506, 298/17 R

[51] Int. Cl. ..........................................B60p 1/28

[58] Field of Search..................214/505, 506, 501; 298/17 R, 298/5

[56] References Cited

UNITED STATES PATENTS

| | | | |
|---|---|---|---|
| 1,538,052 | 5/1925 | Mueller | 298/17 |
| 2,466,452 | 4/1949 | Lisota | 214/505 |
| 2,491,417 | 12/1949 | Pflantz et al. | 298/5 |
| 3,066,816 | 12/1962 | Schwartz | 214/505 |

*Primary Examiner*—Albert J. Makay
*Attorney*—William Anthony Drucker

[57] ABSTRACT

A truck has a load-carrying bed which is mounted on the chassis by a transverse pivot, the load-bearing bed being supported by a road wheel assembly secured to it.

2 Claims, 5 Drawing Figures

INVENTOR:
PRESTON H. SKAGGS

INVENTOR:

PRESTON H. SKAGGS

TRUCK BED

This invention relates to the construction of load-bearing trucks.

The object of the invention is to provide an improved construction whereby a load-bearing bed is made capable of pivoting to a lowered tilted position in which it can be used as a loading ramp, whilst at the same time lowering the chassis of the vehicle by the same amount.

Other objects, features and advantages of the invention will be apparent from the following description, read in conjunction with the accompanying drawings of an embodiment of truck construction in accordance with the invention, and wherein.

Figure 1:
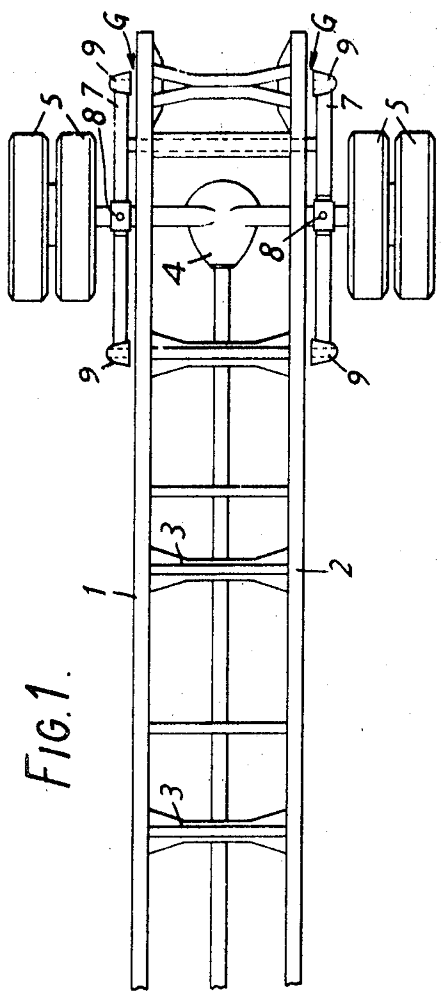
FIG. 1 is a plan view of the rear part of an embodiment of truck chassis, with the bed removed.
Figure 4:
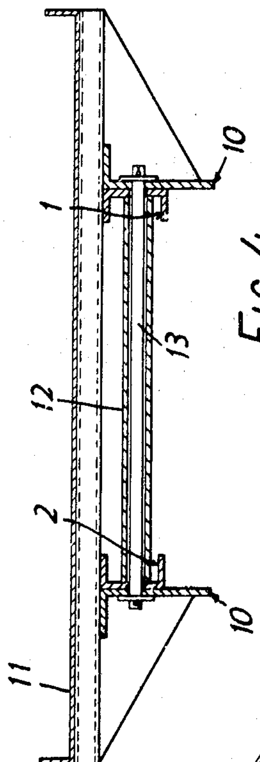
FIG. 4 is a transverse vertical section of the truck chassis, taken in the plane containing the axis of pivoting of the bed.

Referring to FIG. 1, the chassis of the truck comprises the usual longitudinal girders 1 and 2 braced by cross members 3. A rear axle housing 4 carries pairs of wheels 5 and receives the usual propeller shaft 6 transmitting drive to the differential. In one common conventional method of construction, the rear axle assembly would be supported by semielliptical springs 7 each coupled by a saddle 8 to the respective part of the axle housing, the ends of the springs being pivoted to the longitudinal members 1 and 2 of the chassis by pairs of shackles 9. In the construction of the present invention, however, the shackles 9 are not carried by the longitudinal members 1 and 2 of the chassis, but are instead mounted on respective parallel vertical side members 10 secured to the underside of the usual flat bed 11, as best seen in FIG. 4. To accommodate the thickness of the vertical side members 10, the shackles 9 and the saddles 8 are somewhat more widely spaced, transversely of the chassis, than would otherwise be the case, and this wider spacing results in the provision of the small gap "G" which is apparent in FIG. 1.

The assembly constituted by the bed 11 and its two longitudinal side members 10 is pivotably mounted on the chassis members 1 and 2 by the provision, on the members 1 and 2, of a transverse tube 12 within which is disposed a pivot axle 13 which passes at its ends through holes in the longitudinal members 1 and 2, and is locked in position.

The forward end of the bed 11 is coupled to the piston rod 15 of a two-way hydraulic ram 16 mounted on the chassis, whereby the bed can be tilted under the control of the driver of the truck. The bed carries a winch 17 which may be used for pulling a load up the ramp represented by the bed 11 when the bed is in the tilted position shown in FIGS. 2 and 3. FIG. 3 shows a forward end rail 18 for the bed 11 (not shown). The rear end of the bed is chamfered at 20, so as to lie closely against the ground.

Referring to FIG. 3, in which the fully tilted position of the bed is shown in full line and the rest position of the bed in chain-dotted line, it will be seen that the axis 21 of the pivot axle 13 moves to a lowered position when the bed becomes tilted.

The entire rear axle assembly, being secured to the tilting bed, tilts to the same degree as the bed. The small longitudinal movement made by the axle housing is accommodated by a splined slip joint *6a* in the connection between the propeller shaft and the differential drive shaft 6.

Figure 2:
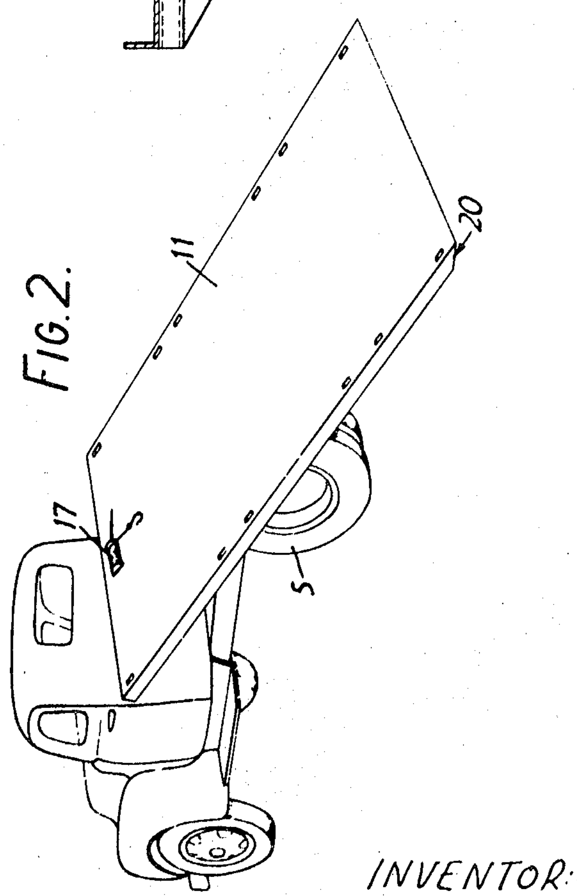
FIG. 2 is a rear perspective view of the truck showing the bed in a tilted position for use as a loading ramp.
Figure 5:
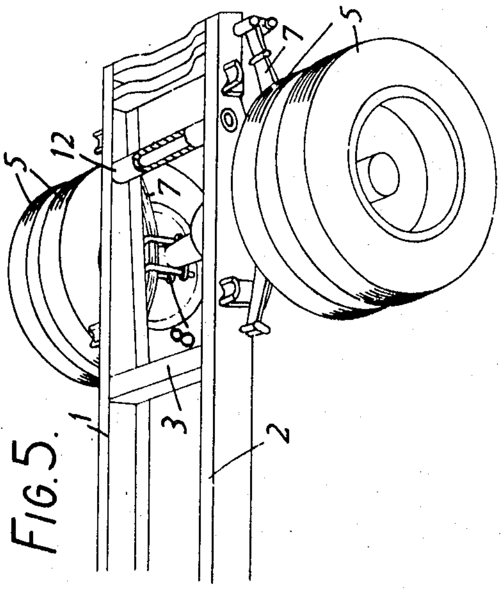
FIG. 5 is a perspective view of part of the truck chassis, to show the positioning of a hinge member for the bed.
Figure 3:
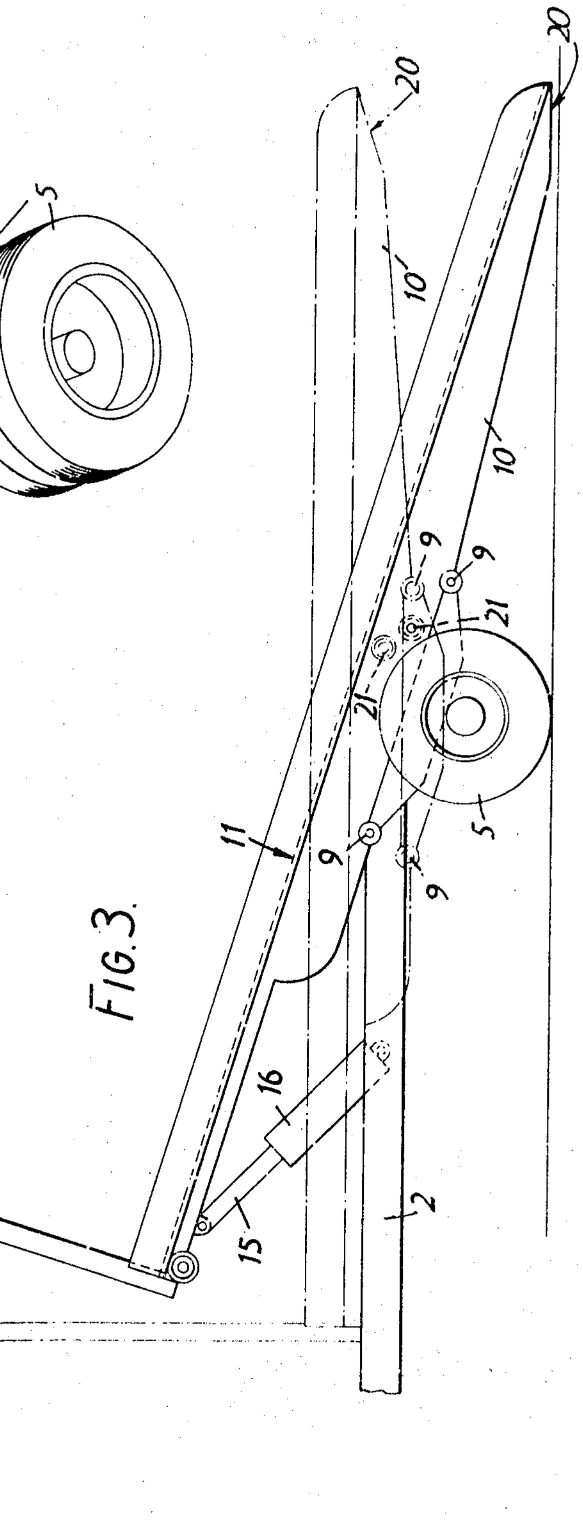
FIG. 3 is a side elevation of a modification.

When it is desired to take up a load, the bed 11 is tilted downwardly at the rear by operation of the ram 16, to the position of FIGS. 2 and 3. The load is then winched up the slope of the bed, until a suitable position is reached. The ram 16 is then again operated to return the bed to the horizontal position of FIG. 4.

The construction described greatly simplifies and speeds up the loading and unloading of most items normally transported by truck. Loading and unloading are performed more rapidly and effortlessly by one person than was possible hitherto with two or more persons. The truck bed retains all of the utility of the conventional truck bed, but in addition it can be converted in a matter of a few seconds into a loading ramp by which self-propelled or deadweight loads can be both loaded and unloaded quickly and effortlessly by one person. The arrangement of the present invention does not affect in any way the maneuverability or speed of the truck. Use of the improved truck bed eliminates the need to provide separate loading equipment, and avoids risk of dropping of a load between the ground and the bed, because the load remains firmly on the bed at all times during loading and unloading.

A particular advantage of the improved construction is that it is more versatile than a conventional truck with fixed bed, and can for example be used with greater safety by operators of tow trucks and other salvage vehicles because it permits the loading and removal of immobilized vehicles or other obstructions in a matter of minutes without interruption to the normal flow of traffic. The location of the hinging point, between the truck chassis and the bed, provides the lowest possible angle of incline for loading and unloading, whilst at the same time retaining the lowest possible bed height on the truck on which it is installed.

I claim:

1. A self-propelled truck having at least two wheel axles comprising: a chassis extending fore-and-aft of the truck; a load-bearing bed having means therewith for loading and unloading said truck; a longitudinally displaceable road-wheel assembly secured in position beneath the load-bearing bed and having a transverse axis of rotation of its wheels; spring means secured between said wheel assembly and said bed by shackles spaced longitudinally on said bed; pivot means acting between said chassis and said bed for mounting said bed on said chassis, the axis of pivoting of said pivot means being positioned on the rear end of said chassis so that said bed tilts rearwardly about said pivot axis without fouling the rear end of said chassis and longitudinally displaces said wheels along said chassis when tilting, said axis of pivoting being positioned on the bed rearwardly between the axis of rotation of the road wheels and the rearward spring shackle; and power-operable means coupled to said chassis and to said bed for tilting said bed about said axis of pivoting.

2. A truck, as claimed in claim 1, comprising winch means on said bed for drawing a load up said bed in inclined position.

* * * * *